United States Patent [19]

Källander

[11] Patent Number: 5,267,268
[45] Date of Patent: Nov. 30, 1993

[54] METHOD FOR REDUCING THE RISK OF POOR RECEPTION IN A MOBILE TELEPHONY SYSTEM

[75] Inventor: Stefan E. P. Källander, Lidingö, Sweden

[73] Assignee: Telefonaktiebolaget L M Ericsson, Stockholm, Sweden

[21] Appl. No.: 771,216

[22] Filed: Oct. 4, 1991

[30] Foreign Application Priority Data

Oct. 5, 1990 [SE] Sweden .............................. 9003197

[51] Int. Cl.$^5$ .......................... H04B 7/02; H04L 1/02
[52] U.S. Cl. ...................................... 375/40; 375/99; 342/361
[58] Field of Search .................... 375/40, 99, 102; 455/295, 296; 342/361

[56] References Cited

U.S. PATENT DOCUMENTS 4,621,368  11/1986  Onoe et al. .................. 375/100 X
4,965,809  10/1990  Endo ............................. 342/361 X

FOREIGN PATENT DOCUMENTS 0279997  8/1988  European Pat. Off. .
2215759  8/1974  France .
2221820  2/1990  United Kingdom .

OTHER PUBLICATIONS

Lee, Y. "Polarization Diversity System for Mobile Radio", IEEE Trans. on Communcations, vol. COM-21, No. 6, pp. 912-923, Oct. 1972.

Primary Examiner—Curtis Kuntz
Assistant Examiner—Bryan Webster
Attorney, Agent, or Firm—Burns, Doane, Swecker & Mathis

[57] ABSTRACT

A method of reducing in a digital time multiplex mobile telephony system the risk of poor reception as a result of the occurrence of points of low signal strength, so-called zero points. Transmission from fixed stations is performed with a polarization direction which is changed stepwise between different parts of the transmitted information. This causes the fading patterns around receiving stations to change in time, and also causes any zero points to be moved in the geography, therewith making it improbable that more than a small part of an information frame will be lost. In the case of a GSM-type system, the polarization direction is changed for each new TDMA-frame.

4 Claims, 1 Drawing Sheet

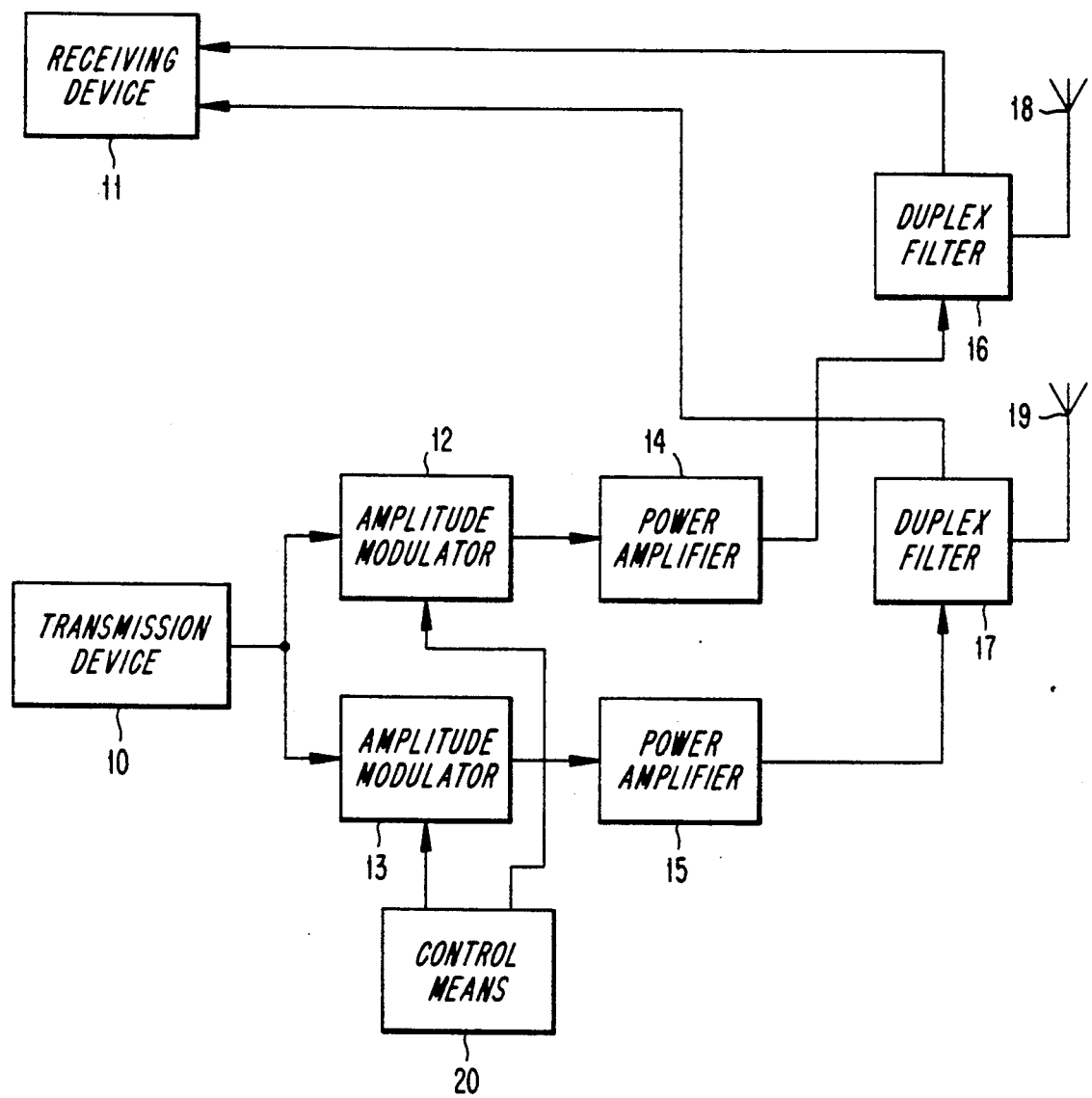

METHOD FOR REDUCING THE RISK OF POOR RECEPTION IN A MOBILE TELEPHONY SYSTEM

TECHNICAL FIELD

The present invention relates to a method for reducing in a digital time-multiplex mobile telephony system the risk of poor reception when transmitting from a fixed station to a mobile station, as a result of reflection of transmitted signals by different objects, wherein each information frame to be transmitted is divided into a plurality of information parts determined by the number of interleaving levels.

BACKGROUND ART

In the case of radio communication between two stations of which at least one is moveable, so-called Rayleigh fading will often occur. This is due to reflection of the radio signals against different objects, such that several signals which have travelled along different paths will mutually coact or counteract one another at different points. Consequently, the strengths of the signals received will vary in accordance with the mutual positions of the transmitter antenna and the receiver antenna, and may temporarily drop to zero or to a value in the vicinity of zero. Reflection of the signals also causes the direction of polarization of the transmitted radio wave to change in accordance with the form of the reflective object. The rate at which signal strength varies is proportional to the relative speed between the stations. On those occasions when the relative speed is zero, the connection may be broken because the input signal of the receiver in one station is excessively low. For example, this can occur in a mobile telephony system when a connection is established from a vehicle which remains stationary in a geographic location where the received signal strength is very low, or when the vehicle moves slowly in such a location. Such locations are called zero points.

It is known that poor reception due to the occurrence of zero points can be avoided with the aid of so-called space diversity. In this case, a station, for example a base station in a mobile telephony system, is equipped with two receiver antennas which are spaced appropriately apart. A so-called diversity effect is obtained in the fixed station with the aid of a suitable addition function of two received signals. This is based on the assumption that the probability of both antennas being located simultaneously in a zero point is small.

In time multiplex mobile telephony systems with digital modulation, the information from each subscriber is divided into information sections, called information frames. These frames are normally called speech frames in speech transmission. In the case of GSM-type systems (Groupe Speciale Mobile), the information in each such frame is divided into a specific number of signal sequences (bursts), which together with corresponding signal sequences from other subscribers form time slots in a plurality of mutually sequential TDMA-frames. Thus, each TDMA-frame includes information parts, i.e. signal sequences, from several subscribers. The number of signal sequences into which the information contained in each information frame is divided is determined by the number of so-called interleaving levels, the so-called interleaving depth in the channel code. In the GSM-system, the interleaving depth is equal to eight, i.e. the content of each information frame is divided into eight signal sequences.

It is known to apply frequency-jump transmission in GSM-type systems. In this case, different TDMA-frames are transmitted on different frequencies. This method is based on the fact that the positions of the zero points are frequency-dependent and that the probability of a geographic location being a zero point at more than one frequency is small when the frequency jump is sufficiently large. The method is suitable for GSM-type systems with deep interleaving.

In radio systems having small cell radii and therewith relatively short transmission distances, for example PCN-type systems (Personal Communication Network), a frequency jump does not provide any marked improvement of the reception at zero points. This is due to small time dispersion, i.e. there is a small time difference between signals that are received subsequent to having travelled through different paths to the receiver. Frequency jumps of reasonable magnitudes do not change the geographic positions of the zero points to any appreciable extent in such systems.

DISCLOSURE OF THE INVENTION

The object of the present invention is to provide a method of the kind defined in the introduction which will avoid the problems caused by poor reception that results from the occurrence of so-called zero points, both in stations equipped with only one antenna and also in systems having relatively small cell radii and therewith relatively small time dispersion. This object is achieved by transmitting from the fixed station with a polarization direction which is changed stepwise between different parts of the information transmitted. As a result, the fading pattern around the receiver antenna of the mobile station will be changed in time and any occurrent zero points will move in the geography, even in systems having small time dispersion, for example in city environments. The polarization direction is changed for each new TDMA-frame in a GSM-system. It is therefore improbable that more than one signal sequence will be lost for a given subscriber.

The characteristic features of the invention are set forth in the following Claims.

BRIEF DESCRIPTION OF THE DRAWINGS

The invention will now be described in more detail with reference to the accompanying drawing, which illustrates an exemplifying embodiment of an arrangement included in the fixed station for the purpose of carrying out the inventive method.

BEST MODE OF CARRYING OUT THE INVENTION

The illustrated arrangement uses two antennas both for receiving and transmitting. When receiving in the fixed station, diversity reception is applied, although this is not a necessary feature of the present invention. The antennas are referenced 18 and 19 and, when receiving, signals received by the receivers are conducted to a receiving device 11, via two duplex filters 16 and 17. When transmitting, signals are generated in a transmission device 10, and are applied to two branches. The signals in the two branches are each conducted to a respective one of the antennas 18, 19 via a respective one of the amplitude modulators 12, 13, a respective one of the power amplifiers 14, 15, and a respective one of the duplex filters 16, 17.

The antennas are oriented so as to have different polarization directions therebetween. For example, the polarization directions may differ by 90 degrees in relation to one another.

The amplitude modulators are controlled by signals from a control means 20 and modulate the signals to power amplifiers so that the powers delivered to the two antennas are changed in relation to each other. This results in a change in the polarization direction of the resultant output signal. In GSM-type radio communication systems with short signal sequences, the amplitude should not be changed during an ongoing signal sequence. This is because such systems do not include an equalizer which can adapt to such changes. In the case of the GSM-system, the polarization angle of the resultant signal is therefore changed after each TDMA-frame, by changing the amplitudes of the signals to the two antennas stepwise after each TDMA-frame. The changes are preferably made so that the polarization angle is changed 180/N degrees for each new TDMA-frame, where N is the interleaving depth in the channel code. This means that N is equal to the number of signal sequences into which each information frame from a subscriber is divided. If the resultant polarization direction from the antennas is changed in this way, it is probable that at most only one signal sequence will be lost, even though the mobile station should be situated in a zero point for a given polarization direction, since the zero point will move for each new signal sequence.

It can be mentioned by way of example that in a GSM-system in which the interleaving depth is equal to eight, each information frame is divided into eight parts which are distributed on eight signal sequences. If each signal sequence has its own polarization angle, it is improbable that two such sequences will give rise to a zero point on the receiver. Transmission at eight different polarization is therefore produced as a result angles. These angles may, for instance, be 0, 22.5, 45, 67.5, 90 degrees, etc. A single lost part of one information frame can be reconstructed in the receiver, with the aid of remaining signal sequences and a so-called error correcting code.

The desired values of changes of the polarization angles between two TDMA-frames are obtained when the control means 20 delivers to the amplitude modulators 12 and 13 control signals which are proportional respectively to the sinus and cosinus of an angle which for each new TDMA-frame is changed to an extent which equals the desired change of the polarization angle.

Time multiplex mobile telephony systems are also found in which the signal sequences are relatively long in comparison with the signal sequences of the GSM-system. For example, systems are found in North America in which the interleaving depth is equal to two between the signal sequences, but where interleaving also occurs within each signal sequence. For example, each information frame is divided into two parts, whereafter the second part of one frame and the first part of the next frame are transmitted in the same signal sequence. When the interleaving depth is equal to four, the contents of said second and first parts are divided into two parts prior to transmission, whereafter these combined four parts are spread appropriately within the signal sequence. For instance, if half the signal sequence is lost, only a quarter of the two original information frames will be lost. Systems of this kind use equalizers which adapt to changes in the channel during a signal sequence. This change may be due, for instance, to movement of a mobile station. The polarization direction can then also be rotated during the signal sequences instead of solely between different TDMA-frames. According to the invention, each of the aforesaid four parts are transmitted with a respective polarization direction. In this case, four different polarization directions are needed in order for all parts of a signal sequence to be transmitted with different polarization directions. Generally, the number of different polarization directions shall be equal to the number of interleaving levels. This enables information parts to be transmitted with different polarization directions from one and the same information frame.

It will be understood that the illustrated arrangement can be modified in several ways. For example, separate antennas can be used for transmitting and receiving purposes. It will be understood from the aforegoing that it is not absolutely necessary to use two antennas for receiving signals in the fixed station. The fixed station may also be equipped with more than two antennas for transmission purposes, wherein all antennas have different polarization directions. Each of the antennas is supplied with signals which have mutually different amplitudes.

I claim:

1. A method for reducing in a digital time multiplex mobile telephony system the risk of poor reception when transmitting from a fixed station to a mobile station, as a result of reflection of transmitted signals by different objects, wherein each information frame to be transmitted is divided into a number of information parts determined by the number of interleaving levels, comprising the steps of:
   transmitting from the fixed station with a polarization direction; and
   changing said polarization direction stepwise in a manner such that all information parts from one and the same information frame are transmitted in mutually different polarization direction;
   wherein the number of different polarization directions coincides with the number of interleaving levels.

2. A method according to claim 1, wherein during said transmitting step, the aforesaid information parts from one and the same information frame are included in a respective TDMA-frame, and during said changing step the polarization direction is changed after each TDMA-frame.

3. A method according to claim 1, wherein the polarization direction is changed after each transmitted information part.

4. A method according to claim 1, further comprising the steps of:
   supplying at least two antennas which are oriented with mutually different polarization directions each with respective signals which have mutually the same frequency and mutually the same information content; and
   modulating the amplitudes of said signals in a manner such that the polarization direction of a resultant output signal from the antennas is changed as in said changing step.

* * * * *